US011825470B2

(12) United States Patent
Wang et al.

(10) Patent No.: US 11,825,470 B2
(45) Date of Patent: Nov. 21, 2023

(54) METHODS AND DEVICES FOR MULTI-CONNECTION TRANSMISSION

(71) Applicant: Telefonaktiebolaget LM Ericsson (publ), Stockholm (SE)

(72) Inventors: Jianfeng Wang, Beijing (CN); Qianxi Lu, Beijing (CN); Zhan Zhang, Beijing (CN); Huaisong Zhu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 74 days.

(21) Appl. No.: 17/461,869

(22) Filed: Aug. 30, 2021

(65) Prior Publication Data

US 2021/0392667 A1  Dec. 16, 2021

Related U.S. Application Data

(63) Continuation of application No. 16/740,363, filed on Jan. 10, 2020, now Pat. No. 11,115,996, which is a
(Continued)

(51) Int. Cl.
*H04W 72/00* (2023.01)
*H04W 72/1268* (2023.01)
(Continued)

(52) U.S. Cl.
CPC ....... *H04W 72/1268* (2013.01); *H04L 5/0044* (2013.01); *H04L 5/0078* (2013.01);
(Continued)

(58) Field of Classification Search
CPC ......... H04W 72/1268; H04W 56/0045; H04W 72/21; H04W 76/15; H04L 5/0044; H04L 5/0078; H04L 5/0023; H04L 5/0048
See application file for complete search history.

(56) References Cited

U.S. PATENT DOCUMENTS 9,345,023 B2 *  5/2016  Gayde ............... H04W 72/27
2010/0192035 A1   7/2010  Sagfors et al.
(Continued)

FOREIGN PATENT DOCUMENTS

CN  101682488 A  3/2010
CN  101836377 A  9/2010
(Continued)

OTHER PUBLICATIONS

"3rd Generation Partnership Project; Technical Specification Group Services and System Aspects; Feasibility Study on New Services and Markets Technology Enablers for Critical Communications; Stage 1 (Release 14)," Sep. 2016, 31 pages, 3GPP TR 22.862, Version 14.1.0, 3GPP Organizational Partners.
(Continued)

*Primary Examiner* — Peter P Chau
(74) *Attorney, Agent, or Firm* — Nicholson De Vos Webster & Elliott LLP

(57) ABSTRACT

A method in a terminal device for transmission to at least a first network device and a second network device over bundled Transmission Time Intervals (TTIs). The method comprises determining that a first TTI for transmission to the first network device overlaps a second TTI for transmission to the second network device based on a first Timing Advance (TA) value associated with the first network device and a second TA value associated with the second network device; and blanking a portion of the first TTI, such that the rest of the first TTI does not overlap the second TTI.

6 Claims, 8 Drawing Sheets

Related U.S. Application Data continuation of application No. 15/502,181, filed as application No. PCT/CN2016/113715 on Dec. 30, 2016, now Pat. No. 10,536,961.

(51) Int. Cl.
| | | |
|---|---|---|
| *H04W 76/15* | (2018.01) | |
| *H04L 5/00* | (2006.01) | |
| *H04W 56/00* | (2009.01) | |
| *H04W 72/21* | (2023.01) | |

(52) U.S. Cl.
CPC ....... *H04W 56/0045* (2013.01); *H04W 72/21* (2023.01); *H04W 76/15* (2018.02); *H04L 5/0023* (2013.01); *H04L 5/0048* (2013.01)

(56) References Cited

U.S. PATENT DOCUMENTS

| | | | |
|---|---|---|---|
| 2013/0242911 A1* | 9/2013 | Heo | H04W 52/367 |
| | | | 370/329 |
| 2014/0056278 A1 | 2/2014 | Marinier et al. | |
| 2014/0140315 A1 | 5/2014 | Kim et al. | |
| 2015/0036666 A1 | 2/2015 | Blankenship et al. | |
| 2016/0014753 A1 | 1/2016 | Wu et al. | |
| 2016/0142898 A1 | 5/2016 | Poitau et al. | |
| 2016/0174238 A1 | 6/2016 | Chen et al. | |
| 2016/0192376 A1 | 6/2016 | Lee et al. | |
| 2016/0242184 A1 | 8/2016 | Dinan | |
| 2016/0278117 A1* | 9/2016 | Sahlin | H04W 72/23 |
| 2016/0295522 A1 | 10/2016 | Qin et al. | |
| 2016/0353451 A1 | 12/2016 | Ko et al. | |
| 2016/0360541 A1 | 12/2016 | Kim et al. | |
| 2017/0027013 A1 | 1/2017 | Kim et al. | |
| 2017/0041917 A1 | 2/2017 | Agiwal et al. | |
| 2017/0048038 A1 | 2/2017 | Seo et al. | |
| 2017/0055232 A1 | 2/2017 | Kim et al. | |
| 2017/0303215 A1 | 10/2017 | Kim et al. | |
| 2017/0374686 A1 | 12/2017 | Agarwal et al. | |
| 2018/0115430 A1 | 4/2018 | Seo | |

FOREIGN PATENT DOCUMENTS

| | | |
|---|---|---|
| CN | 102710399 A | 10/2012 |
| CN | 103188818 A | 7/2013 |
| CN | 104093212 A | 10/2014 |
| CN | 105900475 A | 8/2016 |
| CN | 106256108 A | 12/2016 |
| WO | WO-2013036084 A2 * 3/2013 | ............ H04W 24/10 |
| WO | 2013/159701 A1 | 10/2013 |
| WO | 2015/116866 A1 | 8/2015 |

OTHER PUBLICATIONS

"On URLLC characteristics," Aug. 22-26, 2016, 3 pages, TSG-RAN WG1 #86, R1-167062, Ericsson, Gothenburg, Sweden.
"On URLLC design principles," Aug. 22-26, 2016, 5 pages, TSG-RAN WG1 #86, R1-167061, Ericsson, Gothenburg, Sweden.
Advisory Action received for U.S. Appl. No. 15/502,181, dated May 2, 2019, 3 pages.
Communication pursuant to Article 94(3) EPC, EP App. No. 16847596.0, dated May 25, 2020, 6 pages.
Ex Parte Quayle Action, U.S. Appl. No. 16/740,363, Feb. 23, 2021, 8 pages.
Extended European Search Report for Application No. 16847596.0, dated Oct. 30, 2018, 13 pages.
Final Office Action received for U.S. Appl. No. 15/502,181, dated Feb. 12, 2019, 2019, 25 pages.
First office Action, CN App. No. 201680091846.8, dated Dec. 3, 2020, 13 pages (4 pages of English Translation and 9 pages of Original Document).
International Preliminary Report on Patentability, PCT App No. PCT/CN2016/113715 (Chapter 2), dated Jun. 6, 2019, 6 pages.
International Search Report and Written Opinion for Application No. PCT/CN2016/113715, dated Sep. 6, 2017, 11 pages.
Non-Final Office Action, U.S. Appl. No. 15/502,181, dated Aug. 27, 2018, 35 pages.
Notice of Allowance received for U.S. Appl. No. 15/502,181, dated Sep. 6, 2019, 8 pages.
Notice of allowance, CN App. No. 201680091846.8, dated Feb. 20, 2021, 07 pages (2 pages of English Translation and 5 pages of Original Document).
Notice of Allowance, U.S. Appl. No. 16/740,363, dated Jul. 6, 2021, 8 pages.
Office Action, IN App No. 201717011159, dated Feb. 26, 2020, 6 pages.
Requirement for Restriction/Election, U.S. Appl. No. 15/502,181, dated Jul. 12, 2018, 6 pages.
European Communication pursuant to Article 94(3) EPC, EP App. No. 16847596, dated Mar. 31, 2021, 8 pages.
Decision to grant a European patent, EP App. No. 16847596, dated Aug. 25, 2022, 2 pages.
Hearing Notice, IN App. No. 201717011159, dated Dec. 27, 2022, 2 pages.
Intention to grant, EP App. No. 16847596, dated May 13, 2022, 6 pages.

* cited by examiner

METHODS AND DEVICES FOR MULTI-CONNECTION TRANSMISSION

CROSS-REFERENCE TO RELATED APPLICATIONS

This application is a continuation of application Ser. No. 16/740,363, filed Jan. 10, 2020, which is a continuation of application Ser. No. 15/502,181, filed Feb. 6, 2017 (now U.S. Pat. No. 10,536,961 issued Jan. 14, 2020), which is a National stage of International Application No. PCT/CN2016/113715, filed Dec. 30, 2016, which are all hereby incorporated by reference.

TECHNICAL FIELD

The present disclosure relates to communication technology, and more particularly, to methods and devices for multi-connection transmission, e.g., transmission to two or more network devices over bundled Transmission Time Intervals (TTIs).

BACKGROUND ART

Ultra-Reliable and Low-Latency Communications (URLLC) is a category of services defined in 3GPP TR 22.862, Version 14.1.0. For URLLC services, both high reliability and low latency are required. However, these requirements are mutually conflicting and are typically traded off against each other, which brings a remarkable challenge to user-plane (UP) design.

According to 3GPP TR 22.862, the latency requirement for URLLC services ranges from 1 ms to 10 ms for various applications including automation applications, smart grids and intelligent transportation. The reliability requirement for URLLC services ranges from a residual error rate of $10^{-4}$ to $10^{-6}$, or even to $10^{-9}$. It is to be noted here that in calculating the residual error rate, packets arriving later than the required latency bound, such as 1 ms or 10 ms, will be regarded as errors in the context of URLLC.

Simultaneously achieving such high requirements on both reliability and latency may affect several layers and components in both Radio Access Network (RAN) and Core Network (CN). The URLLC can be considered as an extremely high Quality of Service (QoS) use case for both RAN and CN.

In order to meet the above requirements, it has been proposed to provide a terminal device (e.g., a User Equipment, or UE) with multiple connections to multiple network devices (e.g., evolved NodeBs (eNBs)). This is particularly useful when the terminal device is communicating time-critical data and/or is in poor network coverage (e.g., at cell edge), since the diversity gain provided by the multiple connections can be fully exploited.

FIG. 1 shows an exemplary scenario where such multi-connection transmission is deployed. As shown, a terminal device 110 has uplink (UL) connections with three network devices 120, 122 and 124. In particular, the terminal device 110 transmits UL data to the network devices 120, 122 and 124 over bundled Transmission Time Intervals (TTIs). Successive TTIs are bundled for improving transmission reliability, with each TTI for transmitting the same information to achieve a transmission diversity gain. In the example shown in FIG. 1, six successive TTIs are bundled. The first three of the TTIs, labeled as 1-1, 1-2 and 1-3, are allocated for transmission towards the network device 120, the following two TTIs, labeled as 2-1 and 2-2, for transmission towards the network device 122, and the last TTI, labeled as 3, for transmission towards the network device 124. Optionally, a flexible beamforming scheme can be adopted at the terminal device 110, such that the transmissions towards the network devices 120, 122 and 124 can be carried out via different beams (B1, B2 and B3 as shown in FIG. 1), respectively.

In order to achieve UL synchronization at a network device, a Timing Advance (TA) value is configured for a terminal device for UL transmission towards the network device. However, in the multi-connection transmission scenario, different TA values for different network devices at one single terminal device may become problematic.

FIG. 2 shows an exemplary TA configuration for a terminal device (e.g., the terminal device 110) in a multi-connection transmission scenario (e.g., the scenario shown in FIG. 1). The uppermost line of FIG. 2 shows UL timing at each of the network devices 120, 122 and 124 (it is assumed here that the network devices 120, 122 and 124 have their uplinks synchronized with each other). The three lines below show respective UL transmission timings for the network devices 120, 122 and 124 at the terminal device 110. The TA values for the network devices 120, 122 and 124 are denoted as TA1, TA2 and TA3, respectively and it is assumed here that TA2>TA1>TA3. It can be seen from FIG. 2 that a portion of the last TTI 1-3 for transmission to the network device 120 overlaps a portion of the first TTI 2-1 for transmission to the network device 122 in time, as shown in the hatched regions. That is, since TA2 is larger than TA1, the transmission to the network device 122 is scheduled to begin before the transmission to the network device 120 ends. This is not possible for the terminal device 110 if it has only one radio unit, especially when the beamforming is applied.

There is thus a need for an improved solution for multi-connection transmission with different TA values.

SUMMARY OF THE INVENTION

It is an object of the present disclosure to provide methods and devices for multi-connection transmission, capable of solving the above problem associated with different TA values.

In a first aspect of the present disclosure, a method in a terminal device for transmission to at least a first network device and a second network device over bundled Transmission Time Intervals (TTIs) is provided. The method comprises: determining that a first TTI for transmission to the first network device overlaps a second TTI for transmission to the second network device based on a first Timing Advance, TA, value associated with the first network device and a second TA value associated with the second network device; and blanking a portion of the first TTI, such that the rest of the first TTI does not overlap the second TTI.

In an embodiment, the step of determining comprises determining that the first TTI overlaps the second TTI when: the first TTI precedes the second TTI and the first TA value is smaller than the second TA value, or the first TTI follows the second TTI and the first TA value is larger than the second TA value.

In an embodiment, the blanking is in response to the first network device having a higher received signal power than the second network device at the terminal device.

In an embodiment, the blanking is in response to the transmission to the first network device having a larger number of TTIs than the transmission to the second network device among the bundled TTIs.

In an embodiment, the blanked portion has a length that is a plurality of Orthogonal Frequency Division Multiplexing (OFDM) symbols.

In an embodiment, the method further comprises: notifying the first network device of the blanking of the portion.

In an embodiment, the method further comprises: blanking a portion of the second TTI, such that the rest of the first TTI does not overlap the rest of the second TTI.

In a second aspect of the present disclosure, a terminal device for transmission to at least a first network device and a second network device over bundled Transmission Time Intervals (TTIs) is provided. The terminal device comprises: a determining unit configured to determine that a first TTI for transmission to the first network device overlaps a second TTI for transmission to the second network device based on a first Timing Advance, TA, value associated with the first network device and a second TA value associated with the second network device; and a blanking unit configured to blank a portion of the first TTI, such that the rest of the first TTI does not overlap the second TTI.

In a third aspect of the present disclosure, a terminal device for transmission to at least a first network device and a second network device over bundled Transmission Time Intervals, TTIs is provided. The terminal device comprises a transceiver, a processor and a memory, the memory containing instructions executable by the processor whereby the terminal device is operative to perform the method according to the above first aspect.

The above embodiments of the first aspect are also applicable for the second and third aspects.

In a fourth aspect of the present disclosure, a method in a network device for facilitating transmission from a terminal device to the network device and at least another network device over bundled Transmission Time Intervals (TTIs) is provided. The method comprises: receiving from the terminal device a first TTI having a portion blanked for avoiding overlap with a second TTI for transmission to the other network device; obtaining knowledge of the blanked portion; and decoding the first TTI with the obtained knowledge of the blanked portion.

In an embodiment, the knowledge of the blanked portion is obtained by receiving a notification regarding the blanked portion from the terminal device.

In an embodiment, the knowledge of the blanked portion is obtained based on a position of a reference signal in the first TTI.

In an embodiment, the knowledge of the blanked portion is obtained based on a received signal power during the first TTI.

In an embodiment, the blanked portion has a length that is a plurality of Orthogonal Frequency Division Multiplexing (OFDM) symbols.

In a fifth aspect of the present disclosure, a network device for facilitating transmission from a terminal device to the network device and at least another network device over bundled Transmission Time Intervals (TTIs) is provided. The network device comprises: a receiving unit configured to receive from the terminal device a first TTI having a portion blanked for avoiding overlap with a second TTI for transmission to the other network device; an obtaining unit configured to obtain knowledge of the blanked portion; and a decoding unit configured to decode the first TTI with the obtained knowledge of the blanked portion.

In a sixth aspect of the present disclosure, a network device for facilitating transmission from a terminal device to the network device and at least another network device over bundled Transmission Time Intervals (TTIs) is provided. The network device comprises a transceiver, a processor and a memory, the memory containing instructions executable by the processor whereby the network device is operative to perform the method according to the above fourth aspect.

The above embodiments of the fourth aspect are also applicable for the fifth and sixth aspects.

In a seventh aspect of the present disclosure, a method in a terminal device for transmission to at least a first network device and a second network device over bundled Transmission Time Intervals (TTIs) is provided. The method comprises: determining that a first TTI for transmission to the first network device overlaps a second TTI for transmission to the second network device based on a first Timing Advance, TA, value associated with the first network device and a second TA value associated with the second network device; requesting from the first and second network devices a first and a second transmission grants, respectively, each determined based on the first and second TA values; receiving the first and second transmission grants from the first and second network devices, respectively; and transmitting data to the first and second network devices in accordance with the first and second transmission grants, respectively.

In an embodiment, the step of determining comprises: determining that the first TTI overlaps the second TTI when the first TTI precedes the second TTI and the first TA value is smaller than the second TA value, or the first TTI follows the second TTI and the first TA value is larger than the second TA value.

In an embodiment, the step of requesting comprises: transmitting the first and second TA values to each of the first and second network devices.

In an embodiment, the step of requesting comprises: requesting the first and second transmission grants in an order determined based on the first and second TA values.

In an embodiment, the transmission to the first network device scheduled by the first transmission grant occurs prior to the transmission to the second network device scheduled by the second transmission grant when the first TA value is larger than the second TA value, or the transmission to the first network device scheduled by the first transmission grant occurs after the transmission to the second network device scheduled by the second transmission grant when the first TA value is smaller than the second TA value.

In an eighth aspect of the present disclosure, a terminal device for transmission to at least a first network device and a second network device over bundled Transmission Time Intervals (TTIs) is provided. The terminal device comprises: a determining unit configured to determine that a first TTI for transmission to the first network device overlaps a second TTI for transmission to the second network device based on a first Timing Advance, TA, value associated with the first network device and a second TA value associated with the second network device; a requesting unit configured to request from the first and second network devices a first and a second transmission grants, respectively, each determined based on the first and second TA values; a receiving unit configured to receive the first and second transmission grants from the first and second network devices, respectively; and a transmitting unit configured to transmit data to the first and second network devices in accordance with the first and second transmission grants, respectively.

In a ninth aspect of the present disclosure, a terminal device for transmission to at least a first network device and a second network device over bundled Transmission Time Intervals (TTIs) is provided. The terminal device comprises a transceiver, a processor and a memory, the memory containing instructions executable by the processor whereby the terminal device is operative to perform the method according to the above seventh aspect.

In a tenth aspect of the present disclosure, a method in a network device for facilitating transmission from a terminal device to the network device and at least another network device over bundled Transmission Time Intervals (TTIs) is provided. The method comprises: obtaining a first Timing Advance, TA, value associated with the network device and a second TA value associated with the other network device; determining a first transmission grant associated with the network device and a second transmission grant associated with the other network device based on the first and second TA values, such that any TTI for transmission to the network device to be scheduled by the first transmission grant does not overlap any TTI for transmission to the other network device to be scheduled by the second transmission grant; and transmitting the first and second transmission grants to the terminal device.

In an embodiment, the first and second transmission grants are determined such that: the transmission to the first network device scheduled by the first transmission grant occurs prior to the transmission to the second network device scheduled by the second transmission grant when the first TA value is larger than the second TA value, or the transmission to the first network device scheduled by the first transmission grant occurs after the transmission to the second network device scheduled by the second transmission grant when the first TA value is smaller than the second TA value.

In an embodiment, the step of transmitting the second transmission grant to the terminal device comprises: transmitting the second transmission grant to the second network device for forwarding to the terminal device.

In an eleventh aspect of the present disclosure, a network device for facilitating transmission from a terminal device to the network device and at least another network device over bundled Transmission Time Intervals (TTIs) is provided. The network device comprises: an obtaining unit configured to obtain a first Timing Advance, TA, value associated with the network device and a second TA value associated with the other network device; a determining unit configured to determine a first transmission grant associated with the network device and a second transmission grant associated with the other network device based on the first and second TA values, such that any TTI for transmission to the network device to be scheduled by the first transmission grant does not overlap any TTI for transmission to the other network device to be scheduled by the second transmission grant; and a transmitting unit configured to transmit the first and second transmission grants to the terminal device.

In a twelfth aspect of the present disclosure, a network device for facilitating transmission from a terminal device to the network device and at least another network device over bundled Transmission Time Intervals (TTIs) is provided. The network device comprises a transceiver, a processor and a memory, the memory containing instructions executable by the processor whereby the network device is operative to perform the method according to the above tenth aspect.

With the embodiments of the present disclosure, the overlap between neighboring TTIs for transmission towards different network devices can be avoided and thus the reliability of UL transmission can be improved.

BRIEF DESCRIPTION OF THE DRAWINGS

The above and other objects, features and advantages will be more apparent from the following description of embodiments with reference to the figures, in which.

DETAILED DESCRIPTION

The embodiments of the disclosure will be detailed below with reference to the drawings. It should be appreciated that the following embodiments are illustrative only, rather than limiting the scope of the disclosure.

Figure 1:
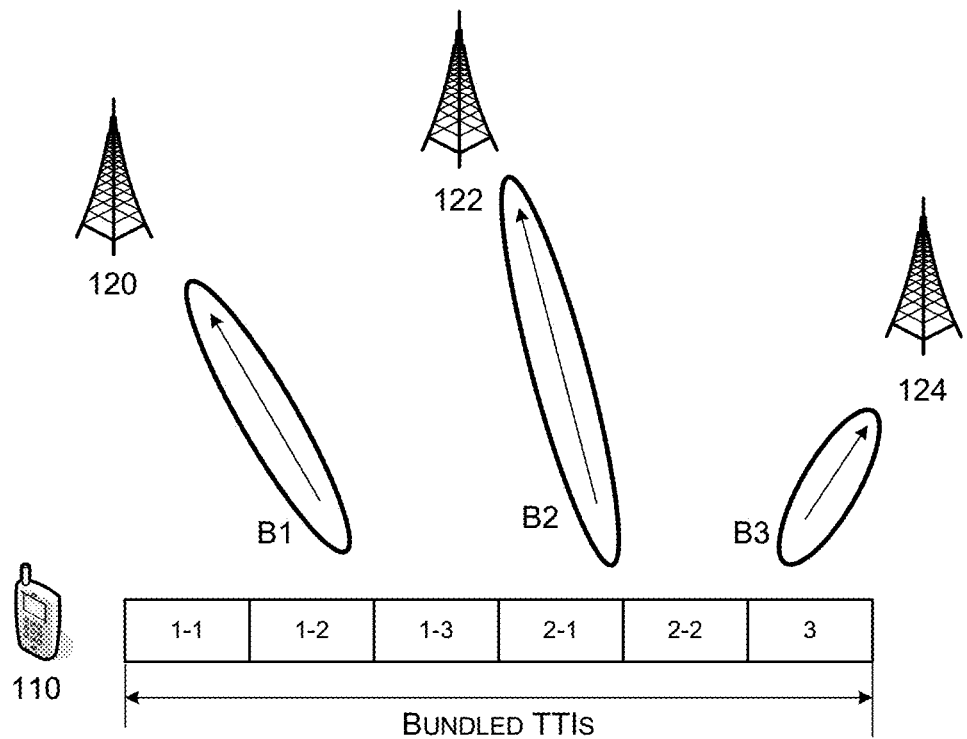
FIG. 1 is a schematic diagram showing an exemplary scenario of multi-connection transmission.
Figure 3:
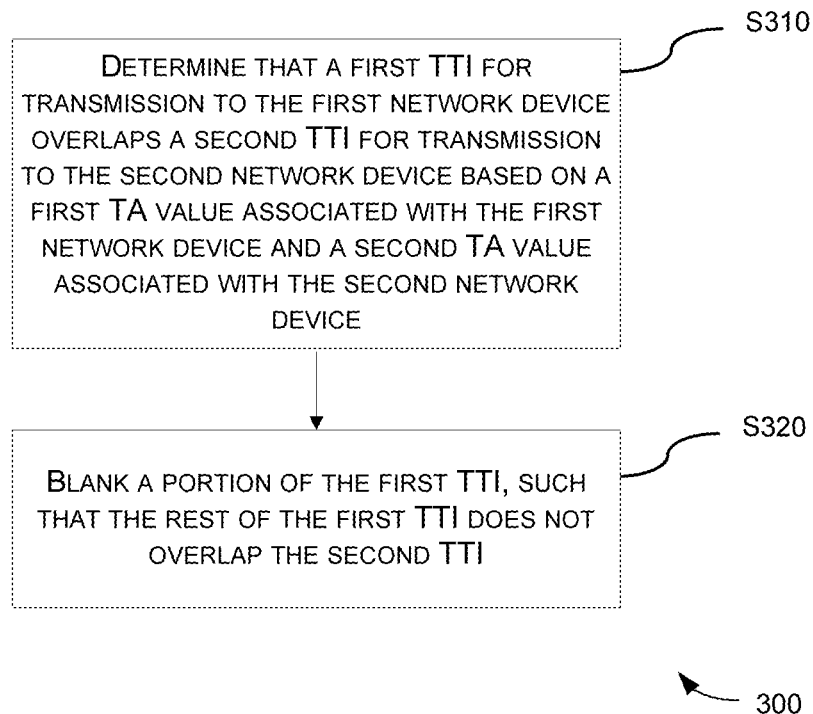
FIG. 3 is a flowchart illustrating a method in a terminal device according to an embodiment of the present disclosure.

FIG. 3 is a flowchart illustrating a method 300 in a terminal device (e.g., the terminal device 110 in FIG. 1) for transmission to at least a first network device (e.g., the network device 120 or 122 in FIG. 1) and a second network device (e.g., the network device 122 or 120 in FIG. 1) over bundled TTIs according to an embodiment of the present disclosure. In the context of the present disclosure, a "TTI" refers to a basic element to be scheduled for transmission in the time domain, which can be e.g., a Transmission Time Interval with general meaning in Long Term Evolution (LTE) or a subframe as in LTE. The method 300 includes the following steps.

At step S310, it is determined that a first TTI for transmission to the first network device overlaps a second TTI for transmission to the second network device based on a first TA value associated with the first network device and a second TA value associated with the second network device.

In an example, in the step S310, it is determined that the first TTI overlaps the second TTI when the first TTI precedes the second TTI and the first TA value is smaller than the second TA value, or when the first TTI follows the second TTI and the first TA value is larger than the second TA value.

At step S320, a portion of the first TTI is blanked, such that the rest of the first TTI does not overlap the second TTI.

In other words, in the step S320, the portion of the first TTI is discarded, or punctured, without being used for transmission, so as to avoid overlap with the second TTI.

Preferably, in order to facilitate combination and demodulation/decoding at the network devices, the blanked portion may have a length that is a plurality of Orthogonal Frequency Division Multiplexing (OFDM) symbols.

In an example, in the step S320, the portion of the first TTI can be blanked when the first network device has a higher received signal power (e.g., Reference Signal Received Power, or RSRP) than the second network device at the terminal device. On the other hand, when the second network device has a higher received signal power than the first network device at the terminal device, a portion of the second TTI can be blanked instead to avoid the overlapping.

Alternatively, in the step S320, the portion of the first TTI can be blanked when the transmission to the first network device has a larger number of TTIs than the transmission to the second network device among the bundled TTIs. On the other hand, when the second network device has a larger number of TTIs than the transmission to the first network device among the bundled TTIs, a portion of the second TTI can be blanked instead to avoid the overlapping.

In an example, the terminal device can notify the first network device of the blanking of the portion. For example, the number of OFDM symbols contained in the blanked portion may typically range from 1 to 3. In this case, a 1-bit or 2-bit indicator can be used to explicitly indicate the blanked portion. With such explicit notification, the first network device can be aware of the blanking and thus will not treat the blanked portion as useful information.

Additionally, a portion of the second TTI can be blanked, such that the rest of the first TTI does not overlap the rest of the second TTI. In this case, each of the first and second TTIs may have a portion blanked to avoid the overlapping.

Figure 4:
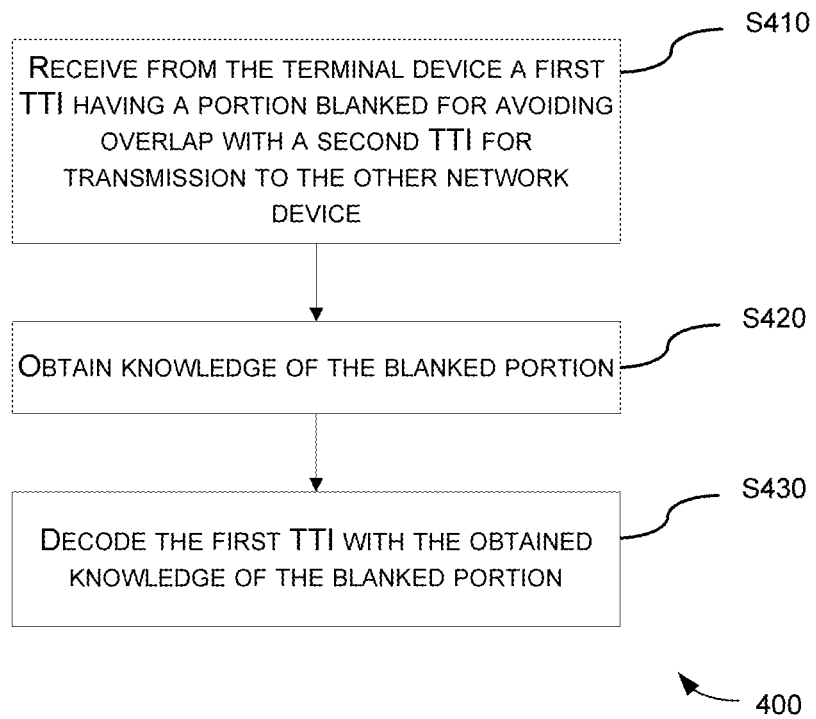
FIG. 4 is a flowchart illustrating a method in a network device according to an embodiment of the present disclosure.

FIG. 4 is a flowchart illustrating a method 400 in a network device (e.g., the network device 120 or 122 in FIG. 1) for facilitating transmission from a terminal device (e.g., the terminal device 110 in FIG. 1) to the network device and at least another network device (e.g., the network device 122 or 120 in FIG. 1) over bundled TTIs. The method 400 includes the following steps.

At step S410, a first TTI is received from the terminal device. The first TTI has a portion blanked for avoiding overlap with a second TTI for transmission to the other network device.

As described above in connection with the method 300, preferably, the blanked portion has a length that is a plurality of OFDM symbols.

At step S420, knowledge of the blanked portion is obtained.

In an example, in the step S420, the knowledge of the blanked portion can be obtained by receiving a notification regarding the blanked portion from the terminal device. Such explicit notification has been described above in connection with the method 300 and the description thereof will be omitted here.

Alternatively, the blanked portion can be detected blindly by the network device. In an example, the knowledge of the blanked portion can be obtained based on a position of a reference signal in the first TTI. The position of the reference signal in the first TTI can be predetermined and known to the network device. The network device can detect the blanked portion based on the position of the reference signal in the received TTI. For example, the reference signal can be transmitted at a fixed position, e.g., in the third OFDM symbol in the TTI. In this case, if the network device receives the TTI having the reference signal in the first OFDM symbol, it can determine that the first two OFDM symbols of the TTI have been blanked.

In another example, the knowledge of the blanked portion can be obtained based on a received signal power during the first TTI. For example, the network device can detect the start and/or end of the TTI based on the received signal power during the TTI. As an example, if a particular portion of the TTI has a lower received signal power than the rest of the TTI by at least a threshold, the network device can determine that the particular portion has been blanked.

At step S430, the first TTI is decoded with the obtained knowledge of the blanked portion. That is, the network device will not treat the blanked portion as useful information.

It is to be noted here that the blanking of the portion does not prevent the information which would otherwise be carried in that portion from being detected. First, the information may be protected by means of error correction coding with a high redundancy (i.e., a low coding rate) and the corresponding information bits may be interleaved before coding. Second, each of the bundled TTIs may carry the same information for achieving a transmission diversity gain, as described above. Accordingly, the TTIs can be selectively combined at the network devices for successful detection of the carried information.

The methods 300 and 400 will be further explained with reference to FIG. 2. In the example shown in FIG. 2, the terminal device 110 may determine that the last TTI 1-3 for transmission to the network device 120 overlaps the first TTI 2-1 for transmission to the network device 122, since TA2>TA1. Then, the terminal device 110 may decide to blank a portion (e.g., the hatched portion) of the TTI 1-3 to avoid the overlapping, e.g., in response to the network device 120 having a higher RSRP than the network device 122 at the terminal device 110, or the transmission to the network device 120 having a larger number of TTIs than the transmission to the network device 122 (3 vs. 2). Optionally, the terminal device 110 can explicitly notify the network device 120 of the blanking. (Alternatively, the terminal device 110 may decide to blank a portion (e.g., the hatched portion) of the TTI 2-1 to avoid the overlapping, and notify the network device 122 accordingly.)

The network device 120 receives the TTIs 1-1, 1-2, and 1-3 and knows that the TTI 1-3 has a portion blanked, e.g., by receiving an explicit notification from the terminal device 110 or detecting the blanked portion blindly as described above. Then, the network device 120 will not treat the blanked portion as useful information in decoding the TTIs.

Figure 5:
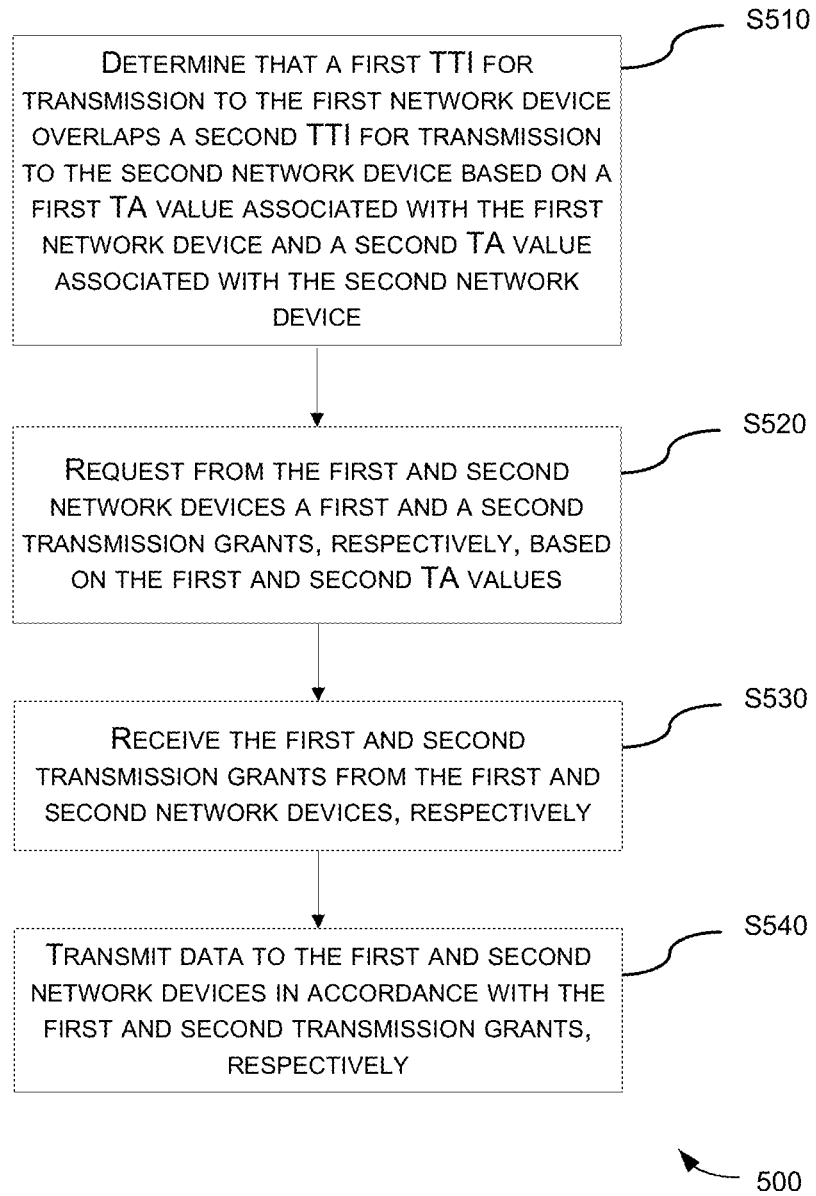
FIG. 5 is a flowchart illustrating a method in a terminal device according to another embodiment of the present disclosure.

FIG. 5 is a flowchart illustrating a method 500 in a terminal device (e.g., the terminal device 110 in FIG. 1) for transmission to at least a first network device (e.g., the network device 120 or 122 in FIG. 1) and a second network device (e.g., the network device 122 or 120 in FIG. 1) over bundled TTIs according to an embodiment of the present disclosure. The method 500 includes the following steps.

At step S510, it is determined that a first TTI for transmission to the first network device overlaps a second TTI for transmission to the second network device based on a first TA value associated with the first network device and a second TA value associated with the second network device. As in the step S310, it can be determined here that the first TTI overlaps the second TTI when the first TTI precedes the second TTI and the first TA value is smaller than the second TA value, or when the first TTI follows the second TTI and the first TA value is larger than the second TA value.

At step S520, a first and a second transmission grants are requested from the first and second network devices, respectively, based on the first and second TA values.

In the step S520, the first and second TA values can be transmitted to each of the first and second network devices, such that the first and second network devices can determine the first and second transmission grants, respectively, based on the first and second TA values.

Alternatively, the terminal device may request the first and second transmission grants in an order determined based on the first and second TA values, such that the network device may determine and transmit the first and second transmission grants in the order determined based on the first and second TA values. For example, if the first TA value is larger than the second TA value, then the terminal device may request the first transmission grant for transmission to the first network device earlier than requesting of the second transmission grant for transmission to the second network device.

At step S530, the first and second transmission grants are received from the first and second network devices, respectively.

At step S540, data is transmitted to the first and second network devices in accordance with the first and second transmission grants, respectively.

Here, in order to avoid the overlapping, the transmission to the first network device scheduled by the first transmission grant can occur prior to the transmission to the second network device scheduled by the second transmission grant when the first TA value is larger than the second TA value. Alternatively, the transmission to the first network device scheduled by the first transmission grant can occur after the transmission to the second network device scheduled by the second transmission grant when the first TA value is smaller than the second TA value.

In order words, the transmission grants can be determined by the network devices such that the transmission associated with a larger TA value can be scheduled to occur earlier. In this way, the overlapping between TTIs can be avoided.

Figure 6:
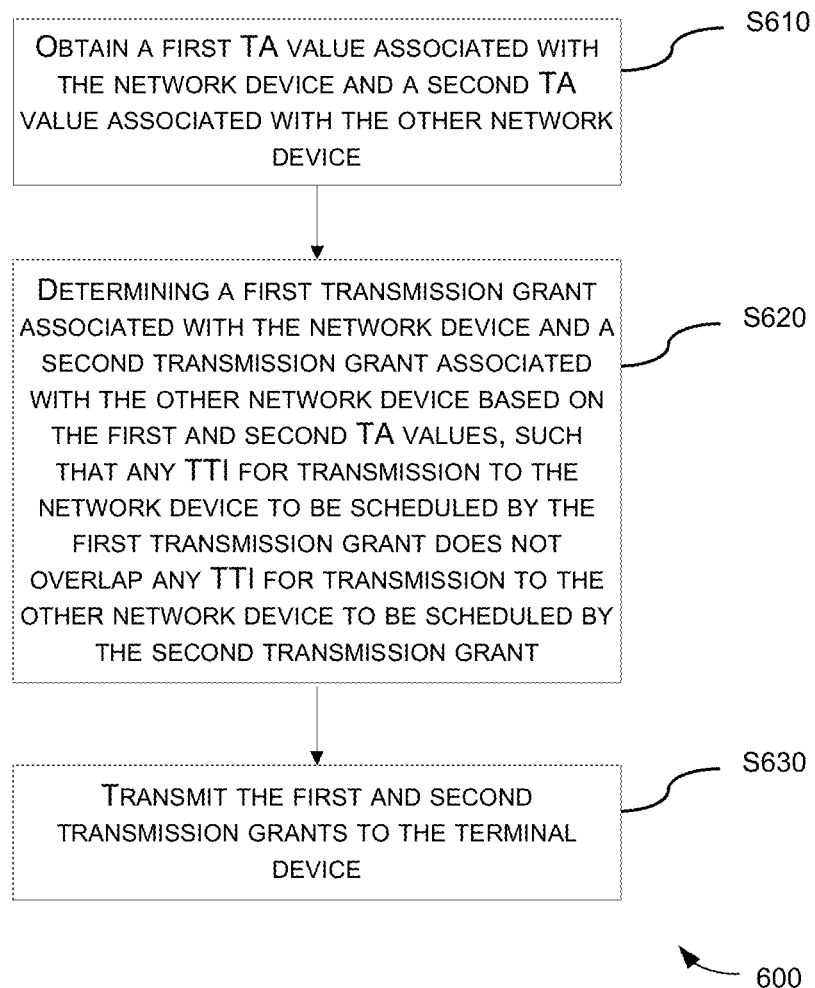
FIG. 6 is a flowchart illustrating a method in a network device according to another embodiment of the present disclosure.

FIG. 6 is a flowchart illustrating a method 600 in a network device (e.g., the network device 120 or 122 in FIG. 1) for facilitating transmission from a terminal device (e.g., the terminal device 110 in FIG. 1) to the network device and at least another network device (e.g., the network device 122 or 120 in FIG. 1) over bundled TTIs. In an example, the method 600 can be performed in a coordinating entity provided in the network device for coordinating UL transmission grants across network devices. The method 600 includes the following steps.

At step S610, a first TA value associated with the network device and a second TA value associated with the other network device are obtained. For example, the first TA value can be obtained by measuring a Physical Random Access Channel (PRACH) from the terminal device locally at the network device. The second TA value can be received from the other network device or a coordinating entity for coordinating UL transmission grants across the network devices. As another example, the terminal device can obtain the first TA value and the second TA value from the network device and the other network device, respectively, and then transmit them to the network device.

Ata step S620, a first transmission grant associated with the network device and a second transmission grant associated with the other network device are determined based on the first and second TA values, such that any TTI for transmission to the network device to be scheduled by the first transmission grant does not overlap any TTI for transmission to the other network device to be scheduled by the second transmission grant. As described above in connection with the method 500, the first and second transmission grants are determined such that: the transmission to the first network device scheduled by the first transmission grant occurs prior to the transmission to the second network device scheduled by the second transmission grant when the first TA value is larger than the second TA value, or the transmission to the first network device scheduled by the first transmission grant occurs after the transmission to the second network device scheduled by the second transmission grant when the first TA value is smaller than the second TA value. In order words, the transmission grants can be determined such that the transmission associated with a larger TA value can be scheduled to occur earlier. In this way, the overlapping between TTIs can be avoided.

At step S630, the first and second transmission grants are transmitted to the terminal device.

In an example, the second transmission grant can be transmitted to the second network device, which then forwards it to the terminal device.

Figure 2:
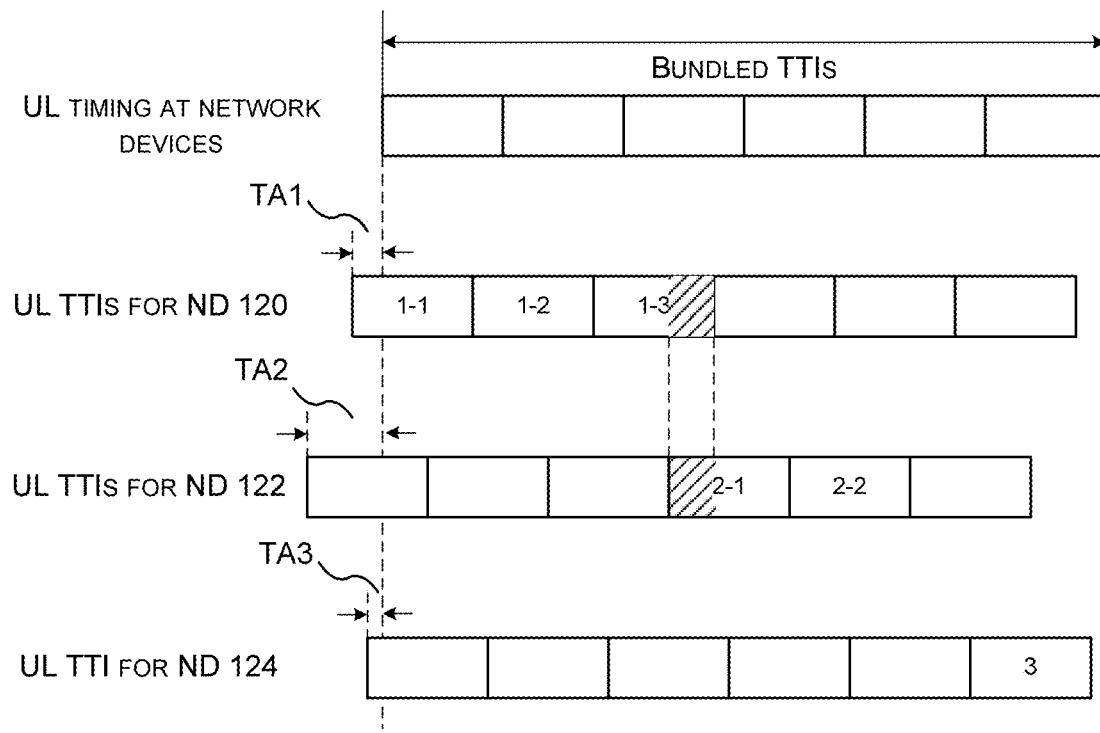
FIG. 2 is a schematic diagram showing an exemplary TA configuration for a terminal device.
Figure 7:
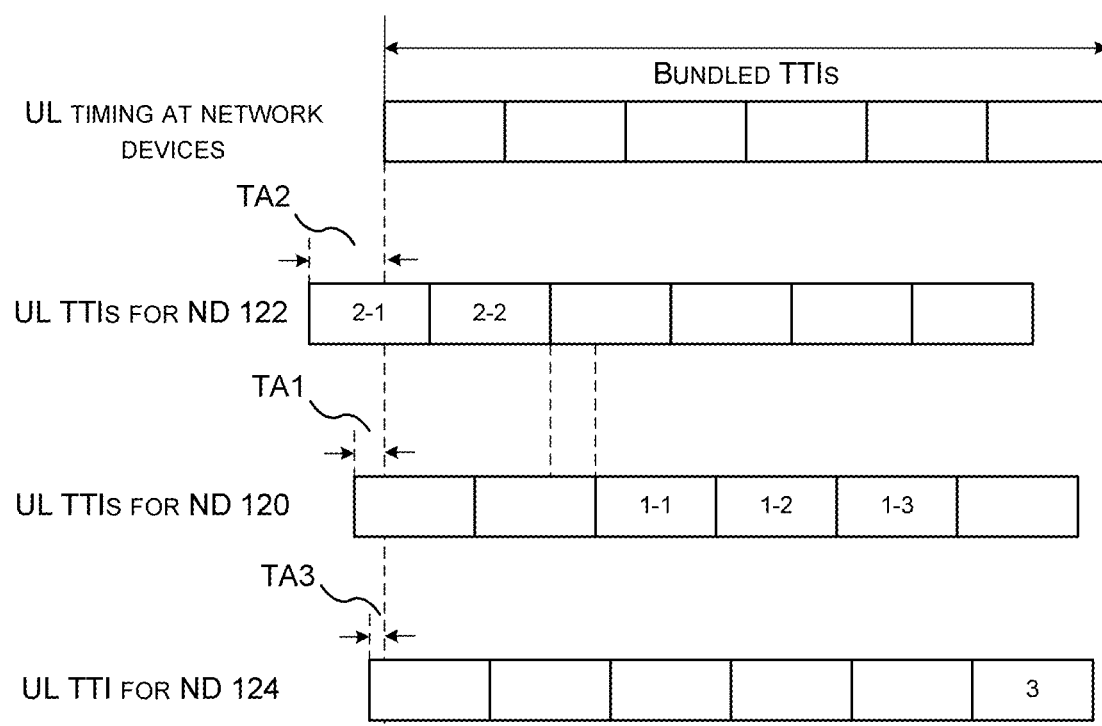
FIG. 7 is a schematic diagram showing re-ordering of the TTIs in FIG. 2 according to the method shown in FIG. 5 or 6.

FIG. 7 shows re-ordering of the TTIs in FIG. 2 according to the method 500 or 600. As shown, in accordance with the rule that a transmission associated with a larger TA value shall be scheduled to occur earlier, the TTIs 2-1 and 2-2 associated with the largest TA value, TA2, are scheduled to occur first in the bundled TTIs. They are followed by the TTIs 1-1, 1-2 and 1-3 associated with TA1, which are in turn followed by the TTI 3 associated with the smallest TA value, TA3. It can be seen from FIG. 7 that any overlapping between TTIs can be avoided in this way.

Figure 8:
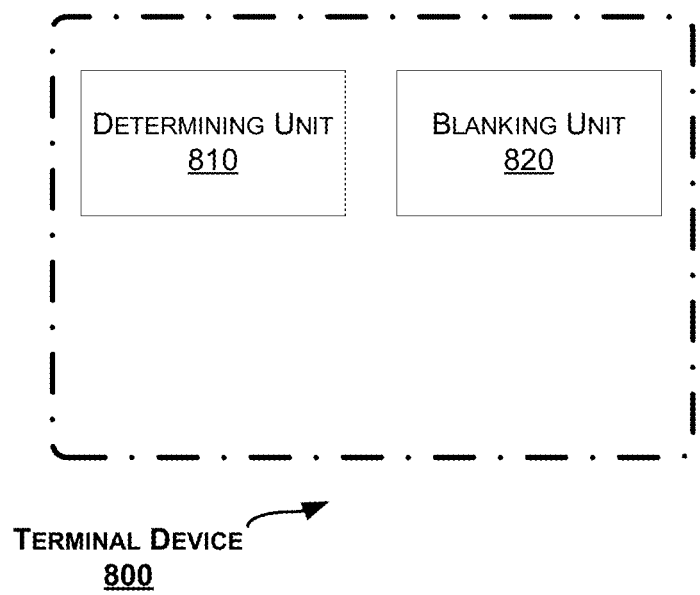
FIG. 8 is a block diagram of a terminal device according to an embodiment of the present disclosure.

Correspondingly to the method 300 as described above, a terminal device is provided. FIG. 8 is a block diagram of a terminal device 800 for transmission to at least a first network device and a second network device over bundled TTIs according to an embodiment of the present disclosure.

As shown in FIG. 8, the terminal device 800 includes a determining unit 810 configured to determine that a first TTI for transmission to the first network device overlaps a second TTI for transmission to the second network device based on a first TA value associated with the first network device and a second TA value associated with the second network device. The terminal device 800 further includes a blanking unit 820 configured to blank a portion of the first TTI, such that the rest of the first TTI does not overlap the second TTI.

In an embodiment, the determining unit 810 is configured to determine that the first TTI overlaps the second TTI when: the first TTI precedes the second TTI and the first TA value is smaller than the second TA value, or the first TTI follows the second TTI and the first TA value is larger than the second TA value.

In an embodiment, the blanking unit 820 is configured to blank the portion of the first TTI in response to the first network device having a higher received signal power than the second network device at the terminal device.

In an embodiment, the blanking unit 820 is configured to blank the portion of the first TTI in response to the transmission to the first network device having a larger number of TTIs than the transmission to the second network device among the bundled TTIs.

In an embodiment, the blanked portion has a length that is a plurality of Orthogonal Frequency Division Multiplexing (OFDM) symbols.

In an embodiment, the terminal device 800 further includes a notifying unit configured to notify the first network device of the blanking of the portion.

In an embodiment, the blanking unit 820 is further configured to blank a portion of the second TTI, such that the rest of the first TTI does not overlap the rest of the second TTI.

The above units 810-820 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 3.

Figure 9:
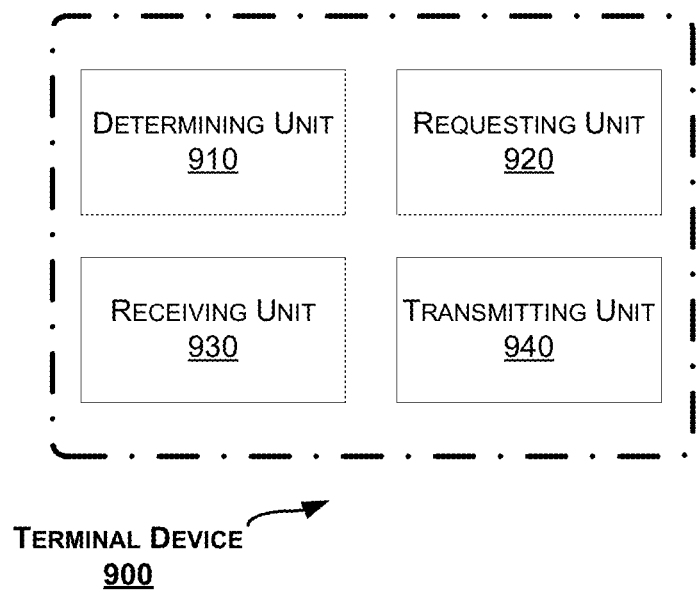
FIG. 9 is a block diagram of a terminal device according to another embodiment of the present disclosure.

Correspondingly to the method 500 as described above, a terminal device is provided. FIG. 9 is a block diagram of a terminal device 900 for transmission to at least a first network device and a second network device over bundled TTIs according to another embodiment of the present disclosure.

As shown in FIG. 9, the terminal device 900 includes a determining unit 910 configured to determine that a first TTI for transmission to the first network device overlaps a second TTI for transmission to the second network device based on a first TA value associated with the first network device and a second TA value associated with the second network device. The terminal device 900 further includes a requesting unit 920 configured to request from the first and second network devices a first and a second transmission grants, respectively, based on the first and second TA values. The terminal device 900 further includes a receiving unit 930 configured to receive the first and second transmission grants from the first and second network devices, respectively. The terminal device 900 further includes a transmitting unit 940 configured to transmit data to the first and second network devices in accordance with the first and second transmission grants, respectively.

In an embodiment, the determining unit 910 is configured to determine that the first TTI overlaps the second TTI when the first TTI precedes the second TTI and the first TA value is smaller than the second TA value, or the first TTI follows the second TTI and the first TA value is larger than the second TA value.

In an embodiment, the requesting unit 920 is further configured to transmit the first and second TA values to each of the first and second network devices.

In an embodiment, the requesting unit 920 is configured to request the first and second transmission grants in an order determined based on the first and second TA values.

In an embodiment, the transmission to the first network device scheduled by the first transmission grant occurs prior to the transmission to the second network device scheduled by the second transmission grant when the first TA value is larger than the second TA value, or the transmission to the first network device scheduled by the first transmission grant occurs after the transmission to the second network device scheduled by the second transmission grant when the first TA value is smaller than the second TA value.

The above units 910-940 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 5.

Figure 10:
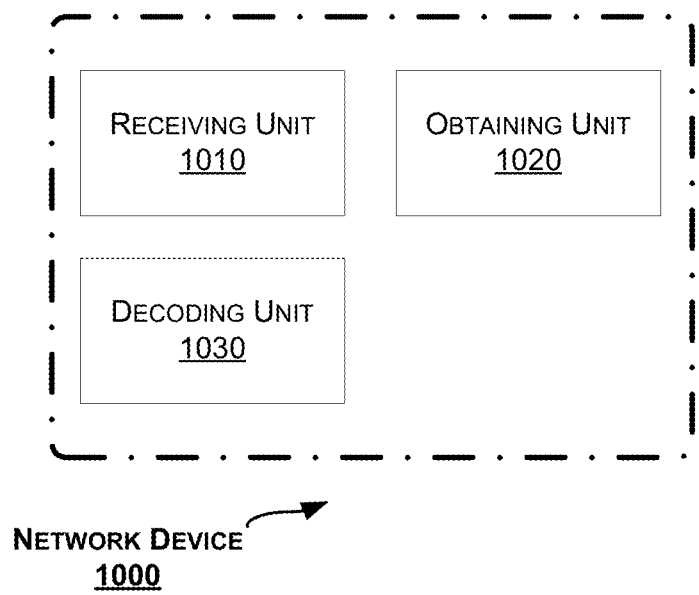
FIG. 10 is a block diagram of a network device according to an embodiment of the present disclosure.

Correspondingly to the method 400 as described above, a network device is provided. FIG. 10 is a block diagram of a network device 1000 for facilitating transmission from a terminal device to the network device and at least another network device over bundled TTIs according to an embodiment of the present disclosure.

As shown in FIG. 10, the network device 1000 includes a receiving unit 1010 configured to receive from the terminal device a first TTI having a portion blanked for avoiding overlap with a second TTI for transmission to the other network device. The network device 1000 further includes an obtaining unit 1020 configured to obtain knowledge of the blanked portion. The network device 1000 further includes a decoding unit 1030 configured to decode the first TTI with the obtained knowledge of the blanked portion.

In an embodiment, the obtaining unit 1020 is configured to obtain the knowledge of the blanked portion by receiving a notification regarding the blanked portion from the terminal device.

In an embodiment, the obtaining unit 1020 is configured to obtain the knowledge of the blanked portion based on a position of a reference signal in the first TTI.

In an embodiment, the obtaining unit 1020 is configured to obtain the knowledge of the blanked portion based on a received signal power during the first TTI.

In an embodiment, the blanked portion has a length that is a plurality of Orthogonal Frequency Division Multiplexing (OFDM) symbols.

The above units 1010-1030 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 4.

Figure 11:
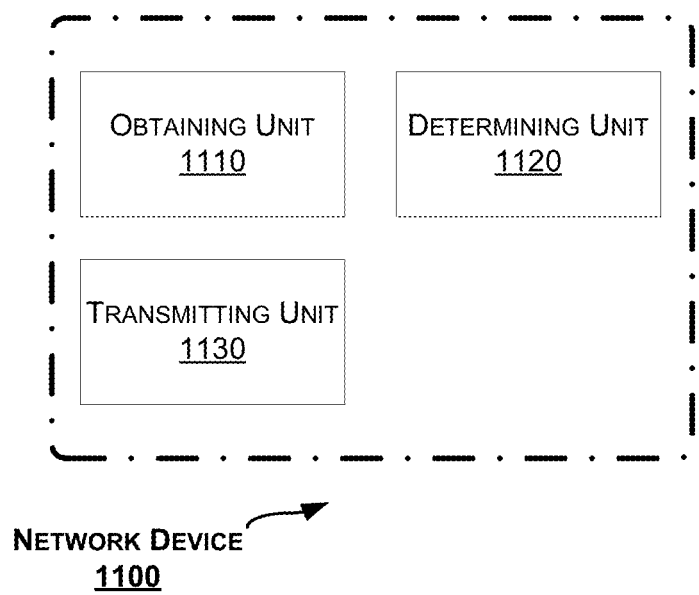
FIG. 11 is a block diagram of a network device according to another embodiment of the present disclosure.

Correspondingly to the method 600 as described above, a network device is provided. FIG. 11 is a block diagram of a network device 1100 for facilitating transmission from a terminal device to the network device and at least another network device over bundled TTIs according to another embodiment of the present disclosure.

As shown in FIG. 11, the network device 1100 includes an obtaining unit 1110 configured to obtain a first TA value associated with the network device and a second TA value associated with the other network device. The network device 1100 further includes a determining unit 1120 configured to determine a first transmission grant associated with the network device and a second transmission grant associated with the other network device based on the first and second TA values, such that any TTI for transmission to the network device to be scheduled by the first transmission grant does not overlap any TTI for transmission to the other network device to be scheduled by the second transmission grant. The network device 1100 further includes a transmitting unit 1130 configured to transmit the first and second transmission grants to the terminal device.

In an embodiment, the determining unit 1120 is configured to determine the first and second transmission grants such that: the transmission to the first network device scheduled by the first transmission grant occurs prior to the transmission to the second network device scheduled by the second transmission grant when the first TA value is larger than the second TA value, or the transmission to the first network device scheduled by the first transmission grant occurs after the transmission to the second network device scheduled by the second transmission grant when the first TA value is smaller than the second TA value.

In an embodiment, the transmitting unit 1130 is configured to transmit the second transmission grant to the second network device for forwarding to the terminal device.

The above units 1110-1130 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 6.

Figure 12:
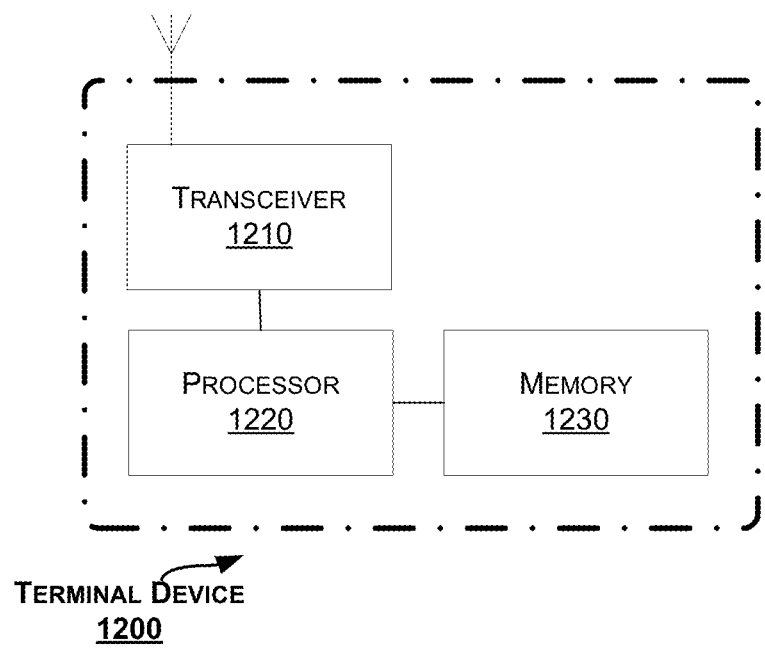
FIG. 12 is a block diagram of a terminal device according to yet another embodiment of the present disclosure.

FIG. 12 is a block diagram of a terminal device 1200 according to yet another embodiment of the present disclosure. The terminal device 1200 is provided for transmission to at least a first network device and a second network device over bundled TTIs.

The terminal device 1200 includes a transceiver 1210, a processor 1220 and a memory 1230. The memory 1230 contains instructions executable by the processor 1220 whereby the terminal device 1200 is operative to perform the actions, e.g., of the procedure described earlier in conjunction with FIG. 3. Particularly, the memory 1230 contains instructions executable by the processor 1220 whereby the terminal device 1200 is operative to: determine that a first TTI for transmission to the first network device overlaps a second TTI for transmission to the second network device based on a first Timing Advance, TA, value associated with the first network device and a second TA value associated with the second network device; and blank a portion of the first TTI, such that the rest of the first TTI does not overlap the second TTI.

Alternatively, the memory 1230 contains instructions executable by the processor 1220 whereby the terminal device 1200 is operative to perform the actions, e.g., of the procedure described earlier in conjunction with FIG. 5. Particularly, the memory 1230 contains instructions executable by the processor 1220 whereby the terminal device 1200 is operative to determine that a first TTI for transmission to the first network device overlaps a second TTI for transmission to the second network device based on a first Timing Advance, TA, value associated with the first network device and a second TA value associated with the second network device; requesting from the first and second network devices a first and a second transmission grants, respectively, each determined based on the first and second TA values; receiving the first and second transmission grants from the first and second network devices, respectively; and transmitting data to the first and second network devices in accordance with the first and second transmission grants, respectively.

Figure 13:
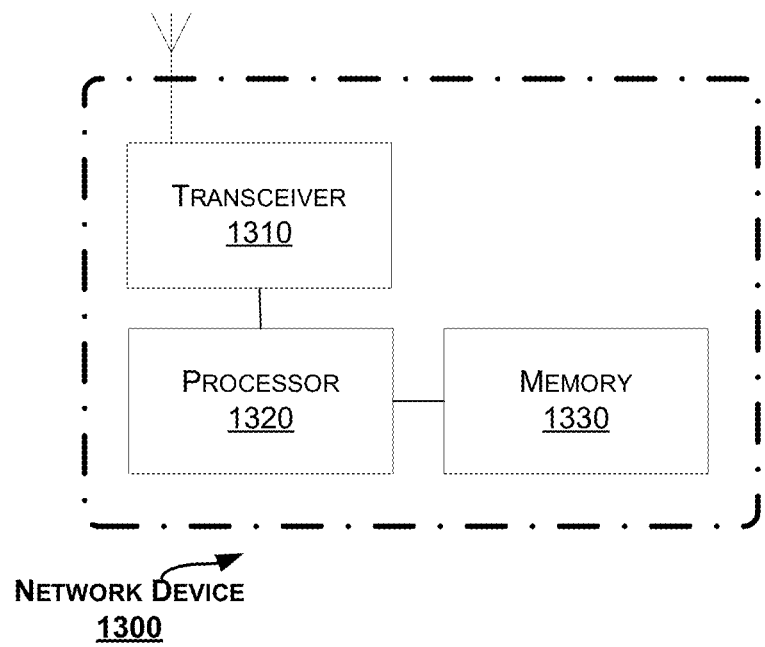
FIG. 13 is a block diagram of a network device according to yet another embodiment of the present disclosure.

FIG. 13 is a block diagram of a network device 1300 according to yet another embodiment of the present disclosure. The network device 1300 is provided for facilitating transmission from a terminal device to the network device and at least another network device over bundled TTIs.

The network device 1300 includes a transceiver 1310, a processor 1320 and a memory 1330. The memory 1330 contains instructions executable by the processor 1320 whereby the network device 1300 is operative to perform the actions, e.g., of the procedure described earlier in conjunction with FIG. 4. Particularly, the memory 1330 contains instructions executable by the processor 1320 whereby the network device 1300 is operative to: receive from the terminal device a first TTI having a portion blanked for avoiding overlap with a second TTI for transmission to the other network device; obtain knowledge of the blanked portion; and decode the first TTI with the obtained knowledge of the blanked portion.

Alternatively, the memory 1330 contains instructions executable by the processor 1320 whereby the network device 1300 is operative to perform the actions, e.g., of the procedure described earlier in conjunction with FIG. 6. Particularly, the memory 1330 contains instructions executable by the processor 1320 whereby the network device 1300 is operative to: obtain a first TA value associated with the network device and a second TA value associated with the other network device; determine a first transmission grant associated with the network device and a second transmission grant associated with the other network device based on the first and second TA values, such that any TTI for transmission to the network device to be scheduled by the first transmission grant does not overlap any TTI for transmission to the other network device to be scheduled by the second transmission grant; and transmit the first and second transmission grants to the terminal device.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 1220 causes the terminal device 1200 to perform the actions, e.g., of the procedure described earlier in conjunction with FIG. 3 or 5; or code/computer readable instructions, which when executed by the processor 1320 causes the network device 1300 to perform the actions, e.g., of the procedure described earlier in conjunction with FIG. 4 or 6.

The computer program product may be configured as a computer program code structured in computer program modules. The computer program modules could essentially perform the actions of the flow illustrated in FIG. 3, 4, 5 or 6.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

What is claimed is:

1. A method in a network device for facilitating transmission from a terminal device to the network device and at least another network device over bundled Transmission Time Intervals (TTIs), the method comprising:
receiving from the terminal device a first TTI having a blanked portion for avoiding overlap with a second TTI for transmission to a second network device;
obtaining knowledge of the blanked portion based on a received signal power during the first TTI; and
decoding the first TTI with the obtained knowledge of the blanked portion.

2. The method of claim 1, wherein the blanked portion has a length that is a plurality of Orthogonal Frequency Division Multiplexing (OFDM) symbols.

3. A network device for facilitating transmission from a terminal device to the network device and at least another network device over bundled Transmission Time Intervals (TTIs) comprising:
- a processor; and
- a memory containing instructions which, when executed by the processor, cause the network device to:
  - receive from the terminal device a first TTI having a blanked portion for avoiding overlap with a second TTI for transmission to a second network device;
  - obtain knowledge of the blanked portion based on a received signal power during the first TTI; and
  - decode the first TTI with the obtained knowledge of the blanked portion.

4. The network device of claim 3, wherein the blanked portion has a length that is a plurality of Orthogonal Frequency Division Multiplexing (OFDM) symbols.

5. A non-transitory computer readable storage medium comprising instructions which, when executed by a processor, cause a network device for facilitating transmission from a terminal device to the network device and at least another network device over bundled Transmission Time Intervals (TTIs), to perform operations comprising:
- receiving from the terminal device a first TTI having a blanked portion for avoiding overlap with a second TTI for transmission to a second network device;
- obtaining knowledge of the blanked portion based on a received signal power during the first TTI; and
- decoding the first TTI with the obtained knowledge of the blanked portion.

6. The non-transitory computer readable storage medium of claim 5, wherein the blanked portion has a length that is a plurality of Orthogonal Frequency Division Multiplexing (OFDM) symbols.

* * * * *